United States Patent [19]
White et al.

[11] Patent Number: 5,870,598
[45] Date of Patent: Feb. 9, 1999

[54] METHOD AND APPARATUS FOR PROVIDING AN OPTIMIZED COMPARE-AND-BRANCH INSTRUCTION

[75] Inventors: James E. White; Kenneth P. Griesser, both of Gilbert, Ariz.

[73] Assignee: Intel Corporation, Santa Clara, Calif.

[21] Appl. No.: 921,281

[22] Filed: Aug. 29, 1997

Related U.S. Application Data

[62] Division of Ser. No. 821,029, Mar. 20, 1997, Pat. No. 5,748,950, which is a continuation of Ser. No. 309,073, Sep. 20, 1994, abandoned.

[51] Int. Cl.$^6$ .................................................. G06F 9/22
[52] U.S. Cl. .................... 395/581; 395/567; 395/595; 395/385
[58] Field of Search ................................. 395/384, 385, 395/386, 387, 388, 389, 581, 567, 595

[56] References Cited

U.S. PATENT DOCUMENTS

| | | | |
|---|---|---|---|
| H1291 | 2/1994 | Hinton et al. | 395/800.23 |
| 4,783,738 | 11/1988 | Li et al. | 395/567 |
| 5,005,118 | 4/1991 | Lenoski | 395/389 |
| 5,119,484 | 6/1992 | Fox | 395/567 |
| 5,333,280 | 7/1994 | Ishikawa et al. | 395/588 |
| 5,448,746 | 9/1995 | Eikemeyer et al. | 395/386 |
| 5,475,853 | 12/1995 | Blaner et al. | 395/389 |

*Primary Examiner*—William M. Treat
*Attorney, Agent, or Firm*—Blakely, Sokoloff, Taylor & Zafman

[57] ABSTRACT

An optimized compare-and-branch instruction for execution in a RISC type microprocessor. An instruction sequencer implemented in the microprocessor is responsive to a compare-and-branch instruction for efficient execution. The instruction sequencer detects a compare-and-branch instruction and executes it as a regular compare instruction. On the next cycle the instruction sequencer translates the instruction into a branch instruction and provides the translated instruction for execution by one of the execution units. The branch is executed, either taken or not taken, and normal program flow continues.

4 Claims, 5 Drawing Sheets

METHOD AND APPARATUS FOR PROVIDING AN OPTIMIZED COMPARE-AND-BRANCH INSTRUCTION

This is a divisional of application Ser. No. 08/821,029, filed Mar. 20, 1997, now U.S. Pat. No. 5,748,950, which is a continuation of Ser. No. 08/309,073, filed Sep. 20, 1994, now abandoned.

BACKGROUND OF THE INVENTION

1. Field of the Invention

The present invention relates to the field of microprocessor architecture. More particularly, the present invention relates to increasing instruction throughput by optimizing instructions executed by the microprocessor.

2. Art Background

As the computer revolution has progressed the quest of microprocessor developers has been to develop chips exhibiting more power and faster performance. Initial efforts focused essentially on increasing transistor populations on single microprocessor integrated circuits. That effort continues with today's microprocessors now housing literally millions of transistors on a single chip. Further integration has allowed processor clock speeds to be greatly increased with the increased density of transistors.

In addition to squeezing performance by overcoming physical limitations, microprocessor design has developed into an art form. Microprocessors are divided into discrete functional blocks through which instructions are propagated one stage at a time. This allows for pipelining of instructions such that when one instruction has completed the first stage of processing and moves on to the second stage, a second instruction may begin the first stage. Thus, even where each instruction requires a number of clock cycles to complete all stages of processing, pipelining provides for the completion of instructions on every clock cycle. This single-cycle throughput of a pipelined microprocessor greatly increases the overall performance of computer systems.

Other enhancements to microprocessor design include the development of superscalar microprocessors which are capable of initiating more than one instruction at the initial stage of the pipeline per clock cycle. Likewise, in a superscalar microprocessor, frequently more than one instruction completes on each given clock cycle. Other development efforts have gone into the simplification of microprocessor instruction sets, developing reduced instruction set computing (RISC) microprocessors which exploit the fact that many simple instructions are more commonly executed than some complicated instructions. Eliminating the complicated instructions from the instruction set provides for a faster executing pipeline. Complicated instructions are carried out by combinations of the more simple instructions.

In order for pipelined microprocessors to operate efficiently, an instruction fetching and sequencing mechanism at the head of the pipeline must continually provide the pipeline with a stream of instructions. However, conditional branch instructions within an instruction stream prevent an instruction fetching mechanism at the head of a pipeline from fetching the correct instruction until the condition is resolved. Since the condition will not be resolved until further down the pipeline, the instruction fetching mechanism may not be able to fetch proper instructions.

One type of instruction that can slow an executing pipeline until a condition is resolved is the compare-and-branch instruction. A microprocessor executing a compare-and-branch instruction will first perform a comparison and then branch to a specified address as determined by the result of the compare operation. The compare-and-branch instruction is a complex instruction which in previous RISC style microprocessor architectures required vectoring to the microprocessor's microcode for executing the compare followed by the branch. For optimal performance, this requires considerable overhead in hardware associated with entering and exiting the processor's microcode. This introduces additional latency to an executing pipeline for the execution of the compare-and-branch instruction.

In addition to the compare-and-branch instruction, there are other pairs of complimentary instructions which also require vectoring to microcode and additional latency resulting in decreased performance for a microprocessor. It would be advantageous, and is therefore an object of the present invention, to provide a mechanism for executing appropriate sequences of complimentary instructions, such as the constituents of the compare-and-branch instruction, in a more efficient manner without introducing complicated hardware or introducing additional latencies required for invoking a microprocessor's microcode.

SUMMARY OF THE INVENTION

From the foregoing it can be appreciated that it is desirable to provide a mechanism for efficiently executing compare-and-branch type instructions as well as other sequences of complimentary instructions without resort to a microprocessor's microcode. Accordingly, it is an object of the present invention to provide a method and apparatus for optimizing the execution of compare-and-branch type instructions as well as other complimentary instructions thus increasing a microprocessor's instruction execution throughput by avoiding resort to the microprocessor's microcode.

These and other objects of the present invention are provided by a mechanism implemented in an instruction sequencer for use in a RISC type microprocessor. The instruction sequencer includes logic for detecting a compare-and-branch instruction and executing it as a conventional compare instruction. The control circuitry then translates the compare instruction opcode into a branch instruction. On the next cycle, the instruction sequencer essentially spins the machine while forcing the branch opcode onto the machine bus for execution by the appropriate execution unit. The branch is executed (taken or not taken) and normal program flow continues. Providing a fast compare-and-branch instruction improves application code density and cache hit rates because separate compare and branch instructions do not have to be issued to obtain optimal performance.

In one embodiment of the present invention, the instruction encoding for a compare-and-branch instruction is implemented in such a way as to differ only slightly from a branch instruction. Comparing and translating logic within the instruction sequencer detects that an incoming instruction is a compare-and-branch instruction and executes the compare instruction based on the two source operands provided with the instruction. The opcode portion of the instruction word is then translated to equal a branch instruction opcode. The branch instruction is then routed back onto the machine bus to be taken or not taken as determined by control bits stored by the previously executed compare instruction.

The present invention is not limited to efficient execution of a compare-and-branch instruction and may be more generally applied to other sequences of complimentary instructions. The comparing logic and translation circuitry for sequencing a compare-and-branch instruction may similarly be used for translating a first instruction into a second instruction for dependent successive execution without requiring additional issue of instructions and without resort to the microprocessor's microcode.

BRIEF DESCRIPTION OF THE DRAWINGS

The objects, features and advantages of the present invention will be apparent from the following detailed description in which.

DETAILED DESCRIPTION OF THE INVENTION

The present invention provides a method and apparatus for efficiently executing sequences of complimentary microprocessor instructions without introducing the additional latency required by resort to the microprocessor's microcode. Throughout this detailed description, numerous specific details are set forth such as instruction code formats and execution pipeline details, in order to provide a thorough understanding of the present invention. It will be appreciated by one having ordinary skill in the art that the present invention may be practiced without such specific details. In other instances, well-known components, structures and techniques have not been described in detail in order to avoid obscuring the subject matter of the present invention. In addition, much of the functionality to be described further herein is described in terms of implemented logic for such things as comparing and multiplexing circuitry for such things as signal selection. Those of ordinary skill in the art will recognize that various components may be utilized for implementing the logic and multiplexing functions to be described herein. Once the functionality of these components and their interoperability is described, those of ordinary skill in the art will be able to implement the present invention with various technologies without undue experimentation.

Figure 1:
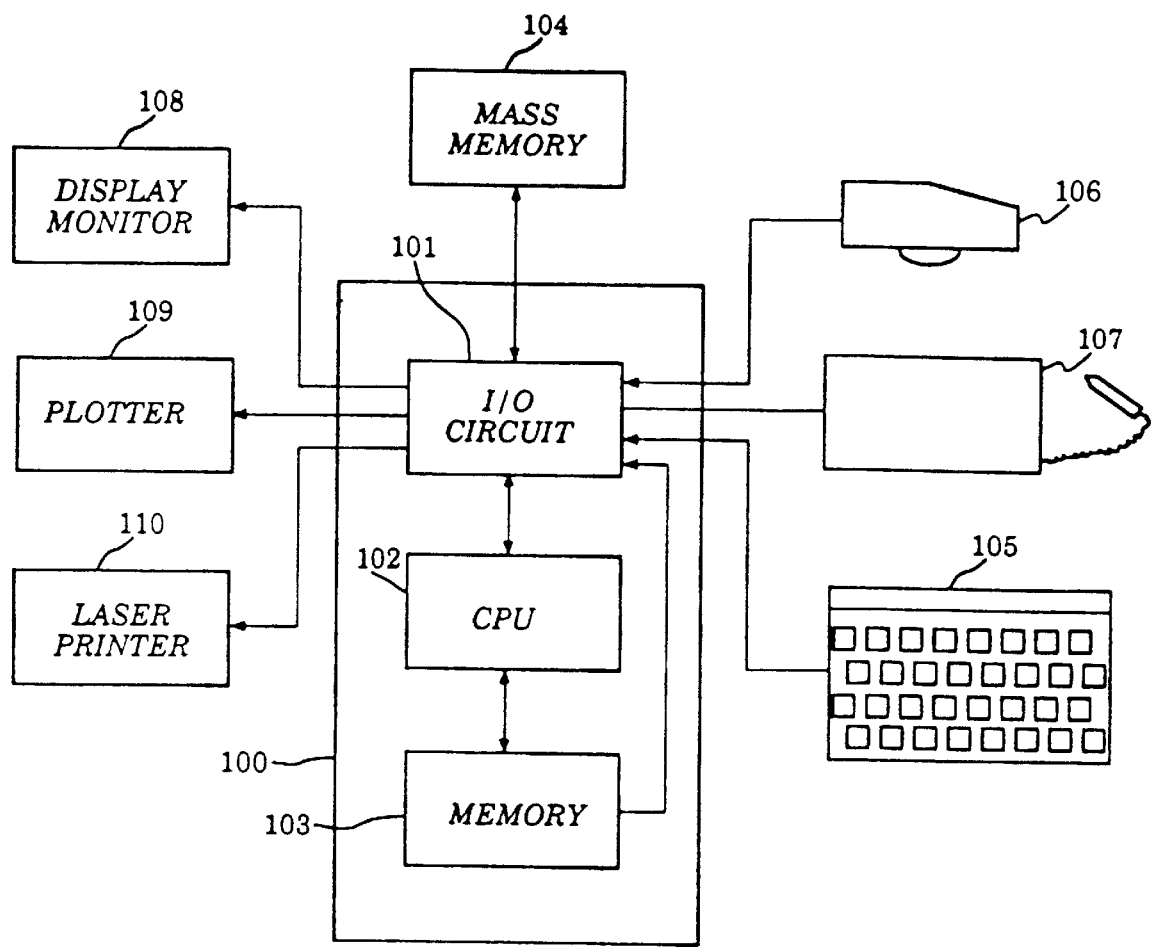
FIG. 1 illustrates a computer architecture which may incorporate the present invention.

Referring first to FIG. 1, a typical computer system which may utilize a microprocessor that implements the present invention is illustrated. As shown in FIG. 1, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processor.

Also shown in FIG. 1 is an input device 105, shown in a typical embodiment as a keyboard. There is also shown as an input device a graphics tablet 107. It should be understood, however, that the input device may actually be in any other well-known input device (including, of course, another computer). A mass memory device 104 is coupled to I/O circuit 101 and provides additional storage capabilities for the computer 100. The mass memory may include other programs and may take the form of magnetic or optical disc drive or any other well-known device. It will be appreciated that the data retained within mass memory 104, may, in appropriate cases, be incorporated in standard fashion into computer 100 as part of memory 103.

In addition, three typical computer display devices are illustrated, the display monitor 108, the plotter 109 and a laser printer 110. Each can be used to display images or documents or other data utilized by the computer 100. A cursor control device 106, such as a mouse, trackball or stylus are also coupled to I/O circuit 101. Other pointing devices may suitably be used as appropriate.

The present invention is most suitable for use in microprocessors which normally require resorting to microcode for execution of complex instructions. Such microprocessor organizations are very common in Reduced Instruction Set Computing (RISC) microprocessors. Of course, other microprocessor architectures may take advantage of the present invention. This is true whether those microprocessors occupy a single chip or more than one chip and regardless of the materials used to fabricate the chip including silicon or gallium arsenide.

Figure 2:
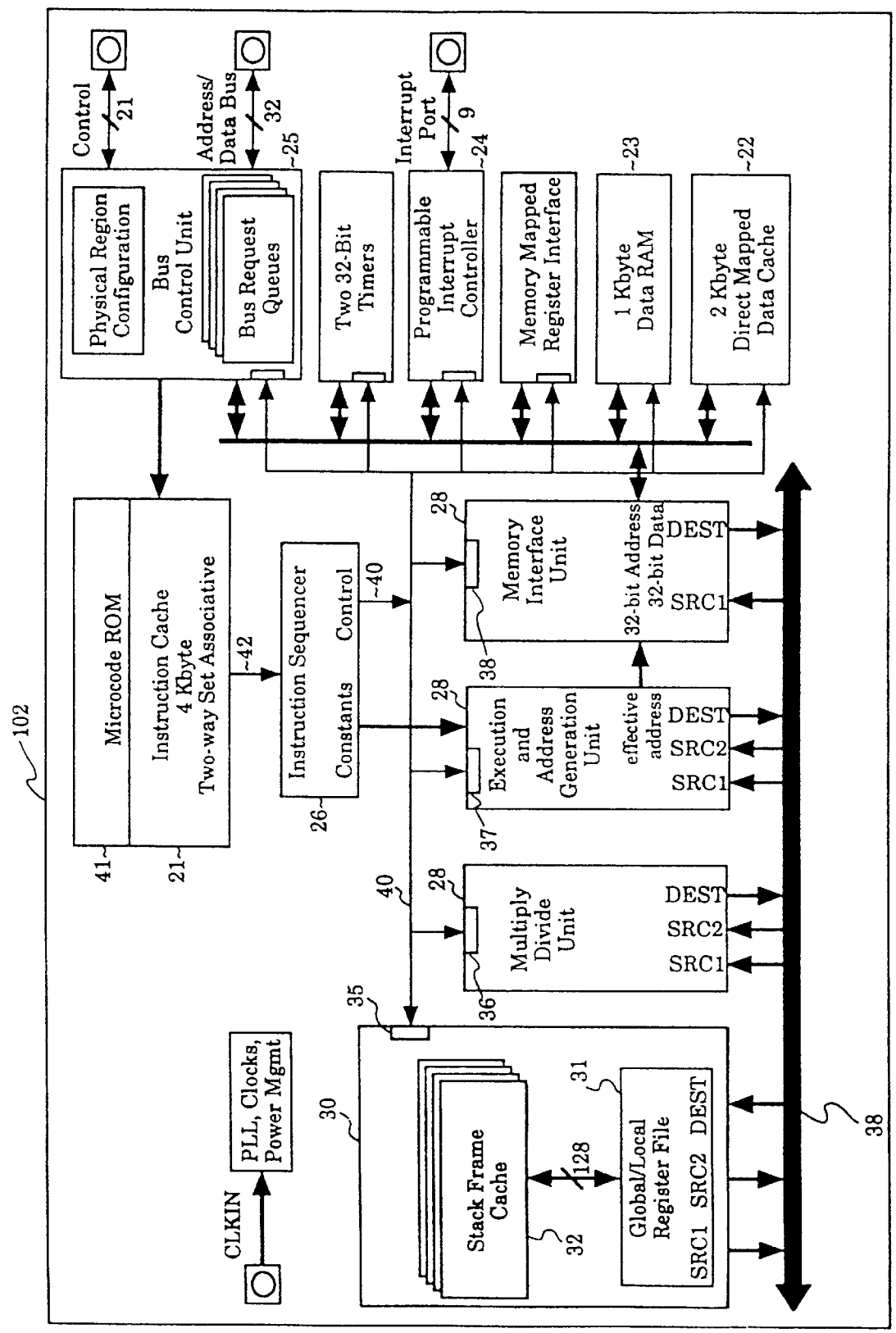
FIG. 2 is a block diagram illustrating one embodiment of a microprocessor which may be implemented in accordance with the teachings of the present invention.

Referring now to FIG. 2, a more detailed block diagram of the CPU 102 is illustrated. The microprocessor illustrated in FIG. 2 is only one embodiment of a microprocessor which may incorporate the present invention. The illustrative processor employs a 4-Kbyte, two-way set associative instruction cache 21, and a 2-Kbyte direct mapped data cache 22. There is also provided a 1-Kbyte data RAM 23 which is accessible to software for efficiency. For example, certain compilers may allocate the most frequently used variables into this RAM to reduce memory reference latencies. A programmable interrupt controller 24 provides a flexible, low latency means for requesting interrupts. It handles the posting of interrupts requested by hardware and software sources. In one embodiment, the interrupt controller 24 acts independently from the core of the processor, comparing the priorities of posted interrupts with the current process priority, off-loading this task from the core of the processor.

The microprocessor depicted in FIG. 2 communicates with external components such as the main memory 103 through a 32-bit multiplexed external bus. The bus control unit 25 is used to direct data transfer into and out of the processor. In one embodiment, the processor is equipped for coupling to a high bandwidth bus that provides burst transfer capability allowing up to 4 successive 32-bit data word transfers. Of course, other bus widths may be supported in alternative embodiments.

The microprocessor configuration illustrated in FIG. 2 utilizes three distinct functional units for carrying out instructions: multiply divide unit 27, execution/address generation unit 28 and memory interface unit 38 for processing memory requests based on addresses generated by execution/address generation unit 28. Instructions are propagated to the functional units through instruction sequencer 26 which is coupled to the instruction cache via instruction bus 42. Instruction sequencer 26 receives instructions from the instruction cache 21 and decodes the instructions to be executed by one of the functional units. Typically, an instruction code (for register instructions) will include an operation code (opcode) and provide information identifying the location of the source operands for the instruction (SRC1 and/or SRC2) as well as indicating a destination (DEST) address for the result of the operation by the execution units. Other instructions such as branches and calls (Control Instructions) include only an opcode and displacement (DISP) which indicates the target instruction of the branch or call.

Within the processor illustrated in FIG. 2, all operations take place at the register level. Source operands specify either a global register, a local register or a constant value as instruction operands. The functional units are coupled to the register file 30 via three independent 32-bit buses. These are identified as source 1 (SRC1), source 2 (SRC2) and the destination (DEST) buses. In alternative embodiments of the present invention, a wider single bus, or smaller multiplexed common bus may be utilized (or various combinations of separate buses) for communicating between the register file 30 and the various functional units.

Figure 3:
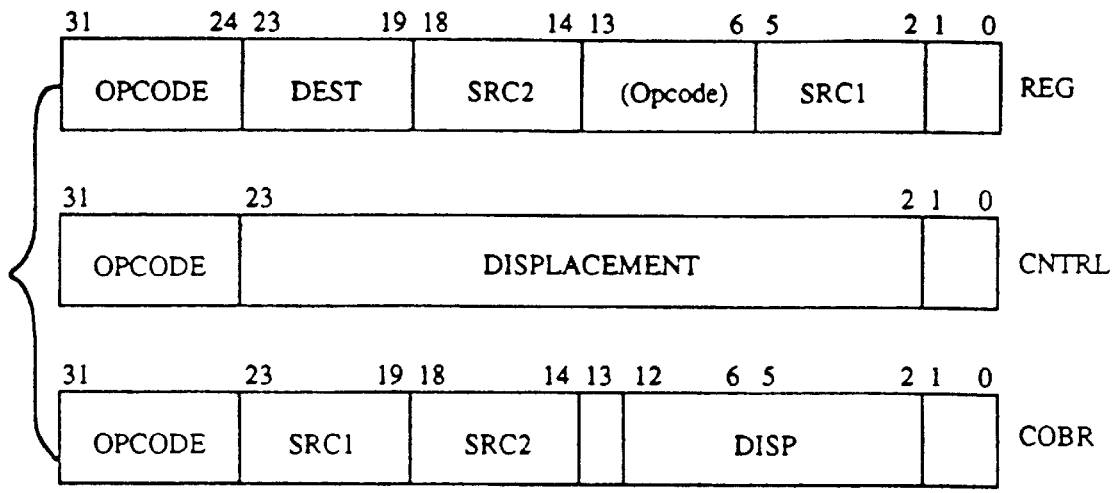
FIG. 3 illustrates various instruction code structures for execution by a microprocessor incorporating the present invention.

In addition to the instruction types identified above, the present invention microprocessor supports a compare-and-branch (COBR) type instruction. This is an encoding optimization which combines compare and branch operations into one instruction. FIG. 3 illustrates the different types of instruction encodings (exclusive of memory operations) for execution by the present invention microprocessor. As can be seen, the COBR type instruction incorporates components present in the other two types of instructions. The opcode provided with a COBR instruction identifies it as that kind of instruction and further identifies which type of COBR instruction is to be executed. For example, one flavor of a COBR instruction is the instruction to compare integer values and branch if equal (cmpibe). Likewise, there is an instruction to compare integer values and branch if not equal (cmpibne). COBR instructions include other comparisons of integer and ordinals and branching instruction dependent upon the various comparisons as determined by the opcode provided with the instruction.

When a COBR instruction is executed, the microprocessor compares the source 2 and source 1 operands provided with the instruction and sets a condition code in a register located in the instruction sequencer according to the comparison results. Subsequently, a portion of the instruction's opcode is compared against the actual condition code. If the comparison results in a match, then the processor branches to an instruction specified by the displacement value propagated with the COBR instruction. Otherwise, the processor goes to the next sequential instruction. Mechanisms for comparing condition codes to a portion of an instruction's opcode are well known for determining branch decisions and will not be described more fully herein.

It can be seen from FIG. 3 that the displacement field provided with a COBR instruction is much shorter than the displacement field provided with control instructions. Accordingly, in accordance with one embodiment of the present invention, the target address for branch must be within $-2^{12}$ to $(2^{12}-4)$ bytes from the current instruction pointer. In alternative embodiments, different length displacement values may be provided with the COBR instruction.

Those of ordinary skill in the art will recognize that without a distinct COBR type instruction, a series of instructions for comparison and branching may be sequentially dispatched and executed. This, however, requires multiple instruction dispatches and is not the most efficient way for executing compare-and-branch type instructions. In the alternative, another mechanism for executing compare-and-branch instructions is to detect one and invoke the microprocessor's microcode engine for performing the various operations. The disadvantage to this approach is the overhead and latency introduced by invoking microcode every time a compare-and-branch instruction is issued.

This solution of the present invention for an efficient handling of compare-and-branch instructions is to optimize the instruction sequencer for successive cycling of compare-and-branching operations.

Figure 4:
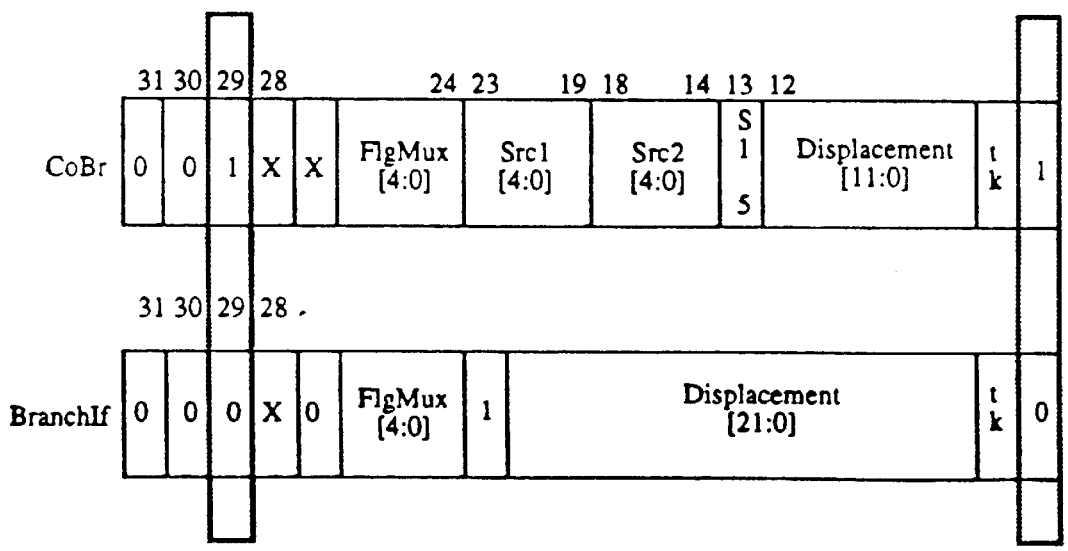
FIG. 4 illustrates the data structure for complimentary instructions for efficient execution by a microprocessor incorporating the present invention.

FIG. 4 illustrates in more detail the physical encoding for two instructions, a compare-and-branch and a BranchIf. The opcode designation for a compare-and-branch is defined to differ from a BranchIf in one embodiment of the present invention by only two bit values, at bits 0 and 29 in the illustrated embodiment. The present invention, as implemented within the instruction sequencer of microprocessor 102, detects an incoming compare-and-branch instruction and executes it strictly as a compare instruction, comparing the source 1 operand to the source 2 operand and appropriately setting the condition code register in the instruction sequencer. The mechanism of the present invention then translates the compare instruction into a branch instruction by altering the appropriate bits of the instruction, and routing the instruction back through the instruction sequencer for execution as a branch instruction. In this manner, multiple instructions need not be dispatched to the instruction sequencer, and resort is not made to the microprocessor's microcode. In alternative embodiments, or for different sequences of complimentary instructions, different numbers of bits and bits in different locations within the instruction, may be the bits that are toggled for translating an instruction. In some embodiments, only one bit value may need to be toggled.

Figure 5:
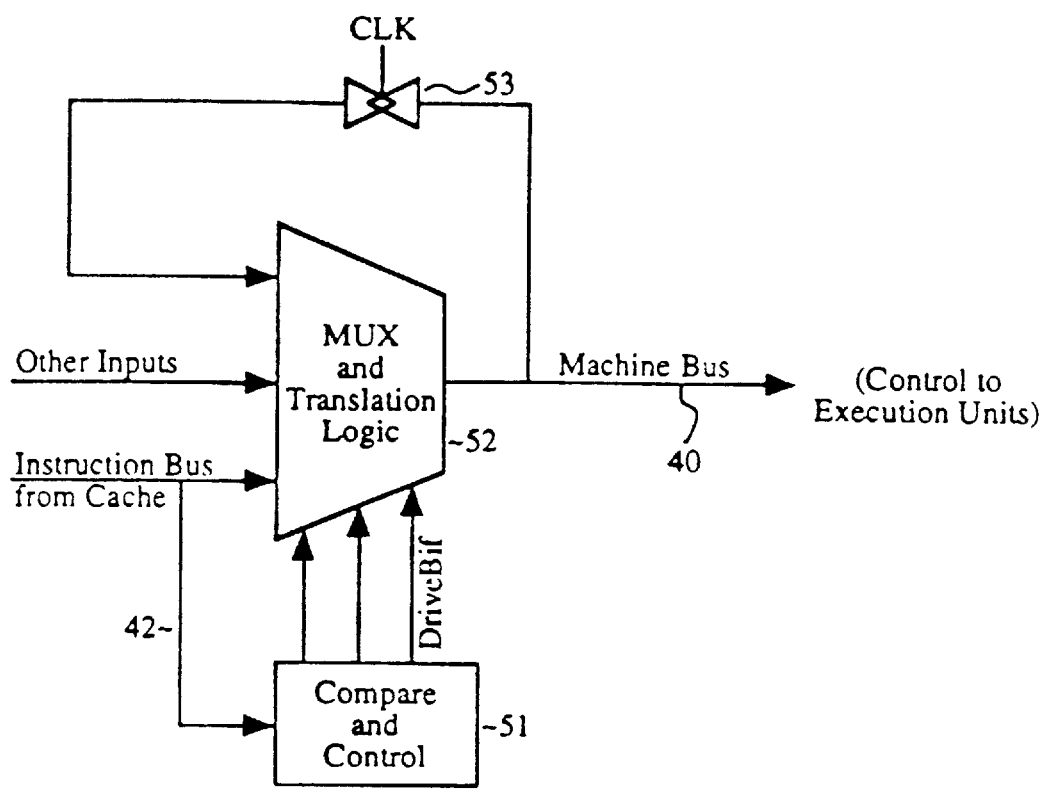
FIG. 5 illustrates a portion of the logic to be implemented within an instruction sequencer implemented in a microprocessor in accordance with one embodiment of the present invention.

Referring now to FIG. 5, a block level diagram of the control circuitry for implementing the present invention is described. When an instruction is dispatched to the instruction sequencer over the instruction bus 42, it is propagated through multiplexing and translation logic 52. Compare and control logic 51 monitors the incoming instructions for driving appropriate control signals to the multiplexing logic 52. Every instruction propagated to the instruction sequencer is monitored by the compare and control logic 51. When an incoming instruction is a compare-and-branch instruction, the compare and control logic 51 provides an active control signal to the multiplexing and translation logic 52.

An incoming compare-and-branch instruction is executed strictly as a compare instruction with the source 1 and source 2 data being provided over the machine bus to the appropriate execution unit. The instruction is also translated by the multiplexing and translation logic 52 into a branch instruction by toggling bits 0 and 29 in one embodiment. The branch instruction is then routed back through the multiplexing and translation logic 52 through feedback buffer 53. The compare and control logic 51 provides a control signal (DriveBif) that instructs the multiplexing and translation logic 52 to propagate the next instruction over the machine bus 40 from the fedback buffer input. Thus, the branch instruction will follow immediately on the heels of a compare instruction and operate according to the result of the compare previously executed. Successive compare and branch instructions need not be dispatched from the instruction cache, nor is there a necessity to resort to the microprocessor's microcode. By eliminating the need for a resort to microcode, at least two clock cycles are saved, thus increasing instruction throughput. Similarly, by implementing the above described logic in the instruction sequencer, the execution units are not burdened with decoding complicated instruction sets where a desired instruction can be decomposed into two complimentary successive instructions by translation of appropriate bits within the instructions opcode.

Figure 6:
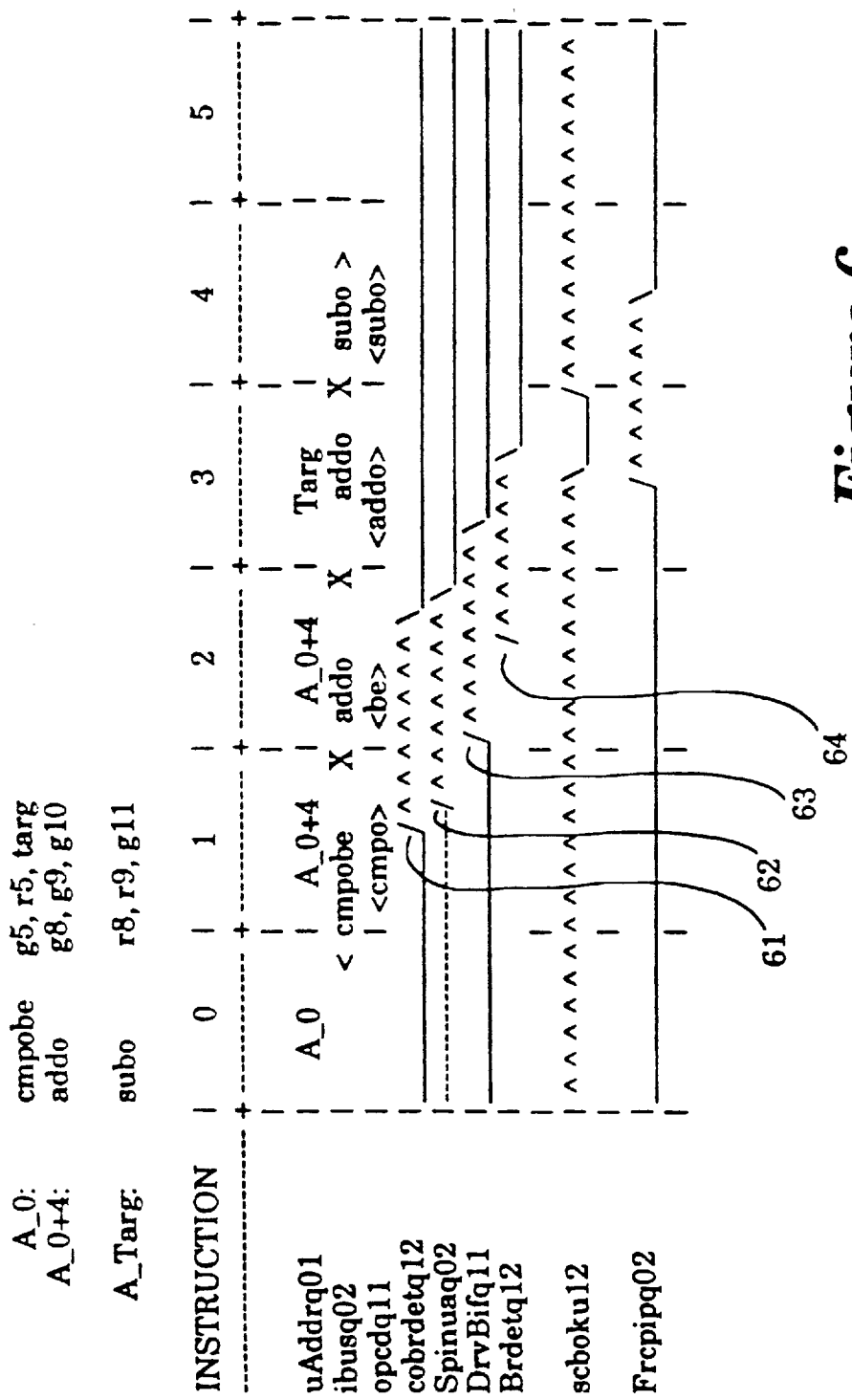
FIG. 6 illustrates a timing diagram for execution of various pipeline stages in accordance with the present invention.

FIG. 6 illustrates a timing diagram for the execution of the following sequence of instructions:

| A_0: cmpobe | g5, r5, A_targ |
| A_0+4: addo | g8, g9, g10 |
| A_targ: subo | r8, r9, g11 |

The first instruction at address A_0 is a compare-and-branch instruction, particularly a 'compare ordinal and branch if equal' instruction. The values stored in global register 5 and local register 5 are compared, and if they are equal, the next instruction to be executed will be at the A_targ address. If the g5 and r5 registers do not contain equal ordinal values, then the next instruction executed is the instruction at address A_0+4. The instruction at the A_0+4 address is an add ordinal instruction for adding the values in global registers 8 and 9 and putting the result in global register 10. The instruction at the A_targ address is a subtract ordinal instruction which subtracts the value in local register 8 from local register 9 and stores the result in global register 11.

From the timing diagram of FIG. 6 it can be seen that as a result of detecting a compare-and-branch instruction at address A_0, the microprocessor is spun for one cycle with the A_0+4 address sitting on the instruction bus for clock cycles 1 and 2. At clock cycle 3 the target address is decoded and the subtract ordinal instruction is executed. Thus, a compare-and-branch instruction completes in 4 clock cycles where having to resort to microcode would have required at least 6 clock cycles. In the timing diagram, it can be seen that at time 61 the compare-and-branch instruction is detected. At time 62, the microprocessor spins the instruction bus until the compare is resolved. At time 63, the multiplexing and translation logic 52 drives the BranchIf instruction onto the machine bus 40 when the DriveBif signal goes active. As the result of the favorable comparison, at time 64, a branch detect signal goes active.

The above described implementation of the optimized compare-and-branch instruction handling can be generalized to other sequences of complimentary successive instructions. Such instruction may include some complex address calculations, such as some loads and stores, which would otherwise require vectoring to microcode. Accordingly, although the present invention has been described in terms of various and illustrated embodiments, those of ordinary skill in the art will appreciate that various modifications and alterations might be made. Accordingly, the scope and spirit of the present invention should be determined in accordance with the claims which follow.

We claim:

1. A method of optimizing a microprocessor's pipeline comprising the steps of:

detecting an issued composite instruction susceptible to execution as successive first and second instructions;

executing the first instruction;

translating the composite instruction into the second instruction; and executing the second instruction.

2. The method of claim 1 further comprising before said translating step the step of feeding back said composite instruction to an instruction translating mechanism.

3. The method of claim 2 further comprising after said translating step the step of selecting the translated instruction for execution.

4. The method of claim 3 wherein said translating step comprises toggling a predetermined number of bits of said composite instruction to correspond to the bit sequence of said second instruction.

* * * * *